Sept. 17, 1935.  N. M. ROSENDAHL  2,014,636
CONVEYER
Filed April 22, 1933
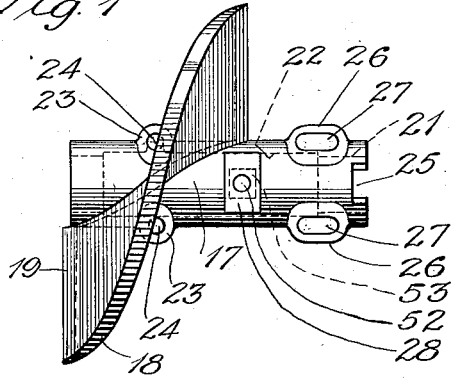
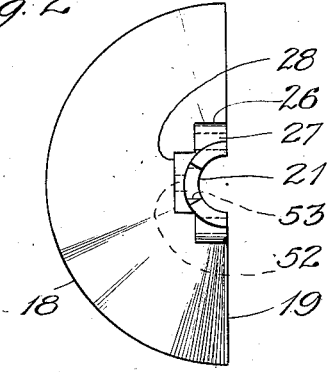
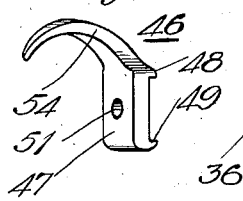
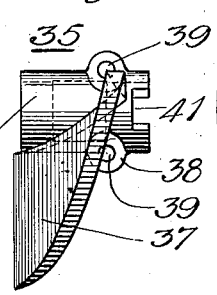
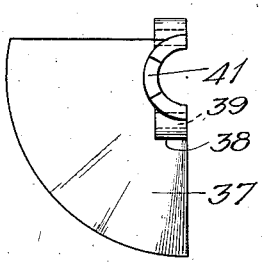
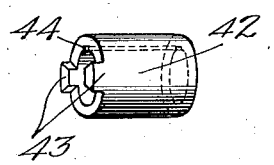
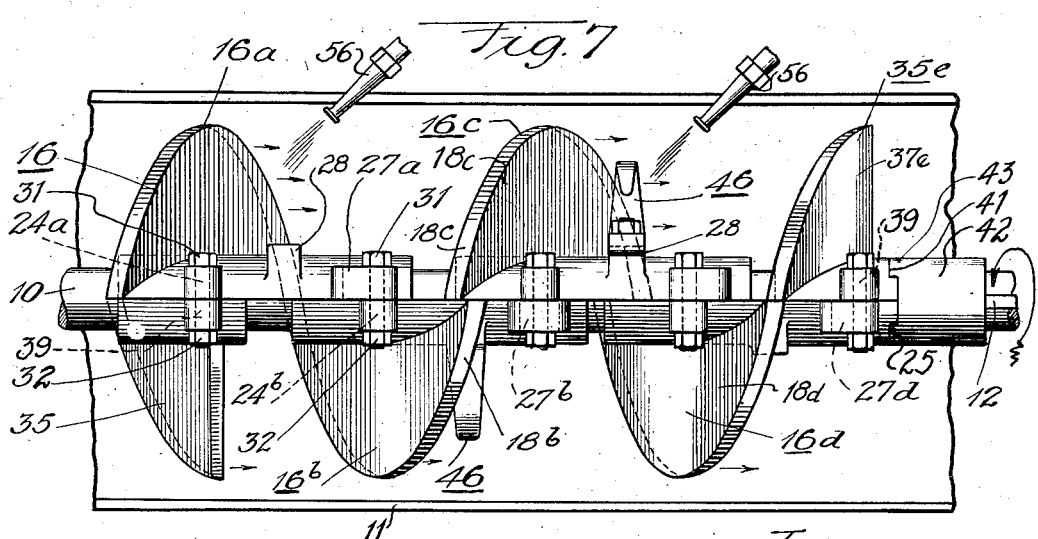
INVENTOR:
NILS M. ROSENDAHL
BY Flournoy Corey
ATTY.

Patented Sept. 17, 1935

2,014,636

UNITED STATES PATENT OFFICE 2,014,636

CONVEYER

Nils M. Rosendahl, Cedar Rapids, Iowa, assignor to Universal Crusher Company, Cedar Rapids, Iowa, a corporation of Delaware Application April 22, 1933, Serial No. 667,421

7 Claims. (Cl. 259—137)

This invention relates in general to devices for conveying material from one point to another and has particular relation to the combination of a screw type conveyer and washer which not only conveys material but which acts to agitate and wash the material while it is being conveyed.

In the art of conveying material by means of a screw conveyer, it is known to utilize a cylindrical trough in which is rotatably mounted a shaft and a screw or helix circling about the shaft and secured to it. The screw may be integral with the shaft or may be of one or more sections bolted or otherwise secured to the shaft, but in all the devices known to the art, the pitch of the screw is the same throughout its length and the screw is continuous in the sense that the spacing between like points on consecutive flights of the screw is the same throughout the length of the conveyer.

It is also known to the art to utilize a series of disconnected sections of a screw or paddles for agitating and conveying the material, but even in this case, the sections of the screw or paddles have the same pitch throughout the length of the conveyer, that is, the paddles are merely discontinuous sections of a single screw of constant pitch.

I have observed that conveyers and agitators of the above character are not entirely satisfactory for several reasons, one of them being that if the screw is continuous the material is advanced in irregular and intermittent batches in accordance with the way it is dumped into the conveyer. This may result in congestion or jams of the material as it is conveyed.

In the devices of the prior art which utilize a conveyer screw built up in sections, it is the usual practice to use conveyer sections or flights of a complete revolution, of a half revolution, and a quarter revolution, but it is apparent that in building conveyers of different lengths that the length of the trough must be so chosen that its length is equivalent to multiples of the space represented by a quarter flight, that is, in choosing the length of the conveyer, the length must be varied in steps equivalent to a quarter turn of the conveyer screw at a time.

It is quite desirable that material being conveyed in a screw type conveyer distribute itself evenly along the length of the conveyer. It is also very desirable, if possible, to agitate and break up the material as it is being conveyed. Furthermore, it is very desirable at times that it be possible to vary the length of the conveyer in less than quarter turns.

I have devised a means of overcoming the difficulties set forth and it is therefore a general object of my invention to provide a new and novel conveyer structure which will avoid the difficulties of the devices of the prior art.

It is a more specific object of my invention to provide a screw type conveyer which will by its own action distribute material evenly along its length in conveying material from one point to another thus causing the material to be deposited in an even stream at the discharge end of the conveyer even though it is received in the conveyer in irregular and intermittent quantities.

Another object of my invention is to provide a screw type conveyer in which the effective pitch of the screw may be varied at will throughout its length.

Another object of my invention is to provide a conveyer of the screw type which not only conveys the material from one point to another but also agitates it as it is being conveyed.

Another object of my invention is to provide a screw type conveyer in which the screw is discontinuous or "lapped" as hereinafter explained.

Another object of my invention is to provide a conveyer which prevents and avoids congestion and jams of the material being conveyed.

Another object of my invention is to provide a screw type conveyer the length of which may be varied at will and in small increments as desired.

Other and further features and objects of the invention will be more apparent to those skilled in the art upon a consideration of the accompanying drawing and following specification, wherein is disclosed several exemplary embodiments of the invention, with the understanding, however, that such changes may be made therein as fall within the scope of the appended claims, without departing from the spirit of the invention. The device may be used or adapted for use for other purposes.

In said drawing:

Figure 1 is an elevational view of a half section or flight of a conveyer constructed according to my invention.

Figure 2 is an end view of the conveyer flight shown in Figure 1.

Figure 3 is a view in perspective of a hook or agitator constructed according to one embodiment of my invention and adapted for use with the flight shown in Figures 1 and 2.

Figure 4 is an elevational view of a quarter section or flight constructed according to my invention.

Figure 5 is an end view of the quarter flight shown in Figure 4.

Figure 6 is a view in perspective of a coupling used for driving the conveyer screw and for constituting a spacer means for spacing the conveyer screw in the conveyer trough, and Figure 7 is a plan view of a section of a conveyer screw and conveyer trough constructed according to my invention.

Referring now to the drawing, a shaft 10 is shown which is the shaft used for supporting and driving the screw of a conveyer constructed according to my invention. The numeral 11 indicates a semi-circular trough of usual construction in which the material which is to be carried by the conveyer is conveyed. The trough may be horizontally disposed or inclined as desired. In the present instance it is preferable that the left end of the trough be at a lower level than the right. The shaft 10 is rotated by means of any usual pulley or other drive mechanism operating through the agency of the key 12. The bearings, the means for rotating the shaft 10, and the trough may be of any desired usual construction and therefore need not be further considered in the present invention, except in their connection with the conveyer and conveyer screw which forms the subject matter of my invention.

In a preferred construction shown in Figure 7, the diameter of the screw is such that there is considerable clearance between the screw and the trough.

The screw of a conveyer indicated generally by the numeral 16, constructed according to my invention, is preferably comprised of sections or flights which may be half sections such as that shown in Figures 1 and 2 or quarter sections such as shown in Figures 4 and 5. Of course, other fractional parts of a section may be employed if desired, but in that event it may be necessary to modify the hub of the section.

A section or flight such as shown in Figures 1 and 2 is comprised essentially of two parts, that is, a hub 17 and a screw section 18. Of course, the flight may be made in one piece or may be constructed of built-up parts as desired. The hub 17 is substantially in the shape of one-half of a cylinder and the thread 18, which in the present instance is one half of a full turn, encircles the half cylinder or hub in approximately two-thirds of the length of the hub. The thread or flight preferably extends one half of its thickness beyond the end of the hub as indicated at 19.

The hub 17 is, of course, built with a circular recess on its inner face inasmuch as it must engage the shaft 10 when the conveyer is set up. This hollowed out portion is indicated by the numeral 21. The hollowed out portion 21 is of course a semi-cylindrical trough for a round shaft or rectangular for a square shaft and is preferably relieved at the inner portion thereof as indicated at 22, in order to avoid machining the entire inner face of the hub, and a notch 25 is formed on the end of the hub for a purpose hereinafter described.

A pair of oppositely disposed bosses 23 are provided on the sides of the hub at a point approximately one-third of the length of the hub and substantially at the mid-point between the outer ends of the helix section or screw 18. These bosses are provided with parallel openings 24 therethrough leading from the top of the bosses into the central portion of the hub. Another pair of bosses 26 are provided near the other end of the hub and these bosses are elongated and provided with elongated parallel openings 27 therethrough.

A substantially rectangular boss 28 is provided on the hub 17 on the outside wall thereof at a point approximately at the inner end of the screw section 18 and the outer surface of the rectangular boss 28 is substantially parallel to a plane passing through the extreme ends of the screw 18.

The screw 16 is built up by clamping a plurality of flights such as that shown in Figures 1 and 2 together in alternate position on the shaft 10 with the flat faces of the hubs of successive flights secured to each other in overlapping, staggered face to face relation. In assembling the screw of the conveyer a flight 16a as indicated in Figure 7 is placed on the shaft 10. A second flight 16b is also placed on the shaft 10 on the opposite side thereof from the flight 16a and with the openings 24b of the flight 16b coinciding with the openings 27a of the flight 16a. Bolts 31 are passed through the openings 24b and 27a and the nuts 32 tightened down until the hubs of the flights 16a and 16b are securely locked in overlapping staggered relation on the shaft 10. In the same manner a third flight 16c is fastened to the flight 16b. The flight 16d may be similarly fastened to the flight 16c and the screw built up in this manner.

When the main portion of the screw has been built up in this manner to any desired length, it is apparent that the hubs of all but the end flights will be securely locked to the shaft 10 and that the threads 18 of the successive flights will form a more or less continuous screw thread.

It is apparent that the outer end of the flights 16a and 16d could not be securely fastened on the shaft 10 at the openings 24a and 27d unless some additional structure were employed for this purpose. Of course, a simple half collar might be employed, but I prefer to utilize a structure such as shown in Figures 4, 5, and 6.

The structure shown in Figures 4 and 5 is a screw section which may be termed a quarter flight and is comprised of a semi-cylindrical hub 36 to which a screw section 37, which is a little better than one-quarter of a revolution, is attached. Bosses 38 which are similar to the bosses 23 are located on opposite sides of the hub and are provided with parallel openings 39 therethrough. The screw 37 does not extend the full length of the hub but extends to a point approximately three-quarters of the length of the hub and from the left end. The right end of the hub is provided with notches as indicated at 41 for a purpose hereinafter described.

In completing the assembly of the screw, the quarter flight 35 is fastened on the shaft 10 opposite to the flight 16a and with the openings 39 coinciding with the openings 24a. The hub 36 is tightly secured on the shaft 10 by means of bolts 31 in the same manner as the other flights were secured. It is apparent, however, that the quarter flight 35 will be at 180 degrees with the left hand portion of the flight 16a. Inasmuch as it is intended that the left end of the conveyer here shown should be lower than the right and that the screw should rotate so that the material is conveyed from left to right as indicated by arrows, it is of particular advantage to have the double thread at the left end of the conveyer where it may be of assistance in starting and breaking up the material which is being conveyed.

Another quarter flight 35e is fastened on the shaft 10 in opposed relation to the flight 16d in order that the screw thread may be continued to the end of the conveyer and in order that the outer end of the flight 16d may be securely fastened to the shaft 10.

As an additional means for holding the end flights on the shaft and for driving the screw, I prefer to utilize a collar 42. This collar is provided with dogs 43 which project into the respective recesses 41 and 25 of the hubs 36 and 17 and serve not only to hold the flights on the shaft but to drive them as well. The collar 42 is provided with a key-way 44 so that the collar is locked on the shaft 10 by means of the key 12 to prevent relative rotation of the collar and shaft.

It is apparent that the location of the extreme ends of the screws 18b and 18c at their abutting position will be determined by the position of the bolt 31 in the elongated opening 27b. If the bolt is at the extreme right end of the elongated opening, the threads as indicated at 18d and 37e will form a continuous thread, but if the bolt is in any other position in the elongated opening, the ends 18b and 18c will not coincide and there will be a "lap" or dropping back of the successive threads the degree of which will be determined by the position of the bolt in the opening 27b.

It is this lapping or dropping back relation of the parts of successive flights which produces breaking up, mixing and distributing of the material being carried by the conveyer. The adjustable relation of the hubs of successive flights permits lengthening or shortening of the screw as a whole to permit it to occupy a greater or lesser space in the trough as desired. The degree of lap between successive flights may be adjusted at will and there may be a wide lap at one end decreasing to the narrow lap or a continuous thread at the other. Thus the degree of breaking up and mixing of the material being carried by the conveyer may readily be controlled. It is apparent, therefore, that the new and improved construction is of particular advantage for carrying, mixing, agitating and washing material.

Material being carried along by the thread will be carried along at a uniform rate so long as the thread of the conveyer is continuous, but when a lapped relation of the thread is reached the material stops its progressive movement and, if the slope of the conveyer trough is sufficiently great, drops back against and is struck by the next succeeding blade to be carried onward again, thus assisting in mixing the material. If desired, slot 27 may be sufficiently long that a succeeding blade is slightly ahead of the previous blade so that a part of the material is divided out each time a lap occurs.

In order to assist in agitating the material being carried by the conveyer I may use an agitator hook 46 such as shown in Figures 3 and 7. This hook is comprised of a base portion 47 provided with flanges 48 and 49 to permit it to engage the rectangular boss 28. The base portion 47 has an opening 51 therethrough to permit the base to be bolted to the rectangular boss 28. An opening 52 is provided in the boss 28 and a rectangular recess 53 is provided on the inside of the hub 17 so that the bolt head may be inserted in the recess with the bolt projecting through the opening 52 of the hub and the opening 51 of the hook so that the hook may be bolted to the hub 17. I prefer to provide a sickle-shaped curved and pointed portion 54 of the hook for agitating the material being carried by the conveyer. Two of these hooks 46 are shown in Figure 7 of the drawing. I may also use nozzles 56 for conducting water or other fluid into the trough 11 to assist in agitating, washing, dividing or digesting the material being carried by the conveyer.

It is apparent that I have provided a new and novel conveyer structure. Modifications thereof may be made by those skilled in the art and such modifications may be made without departing from the spirit and scope of the invention as set forth in the appended claims.

I claim as my invention:

1. In a conveyer, a plurality of helical flights secured together in staggered relation, said flights having hubs having coacting openings therethrough to permit the hubs to be bolted together, said hubs having some of the openings thereof elongated whereby one hub may be bolted upon another at any desired position through a limited space, bolting means for bolting the hubs together, the bolting means and the elongated openings of the hubs constituting means for permitting limited longitudinal adjustment of successive flights to produce any desired lapping of the threads of the successive flights.

2. In a conveyer, a shaft, a plurality of conveyer screw flights each comprised of a hub and a screw portion secured on the shaft in overlapping, staggered, face-to-face relation, a flat boss on the hub of each flight located at a point approximately two-thirds of the distance from one end of the hub and substantially even with the inner end of the screw portion, and a curved agitator hook secured to the boss.

3. In a flight for a conveyer, a semi-cylindrical hub, a semi-circular screw portion beginning at one end of the hub and circling about it for approximately two-thirds of its length, the hub having a first pair of openings therethrough at a point substantially half way of the screw thread, and the hub having a pair of elongated openings therethrough at points near the end of the hub opposite to the portion on which the screw is located whereby a plurality of such flights may be arranged in staggered face-to-face relation and secured to one another for longitudinal adjustment by means associated with the first pair of openings in one flight and the elongated openings of the next, and securing means.

4. In a flight for a conveyer, a semi-cylindrical hub having a flat inner face, a semi-circular screw portion beginning at one end of the hub and circling about it for approximately two-thirds of its length, the hub having a first pair of openings therethrough at a point substantially half way of the screw thread, the hub having a pair of elongated openings therethrough at points near the end of the hub opposite to the portion on which the screw is located, a boss on the hub located at a point substantially at the inner end of the screw and extending with its outer face substantially parallel to the inner face of the hub.

5. In a flight for a conveyer, a semi-cylindrical hub, a semi-circular screw portion beginning at one end of the hub and circling about it for approximately two-thirds of its length, the hub having a pair of openings therethrough at a point substantially half way of the screw thread and the hub having a pair of elongated openings therethrough at points near the end of the hub opposite to the portion on which the screw is located, the latter pair of openings being elongated to permit the flight to be adjustably secured to another flight, the end of the hub opposite the screw having notches to afford a means of rotating the flight.

6. In a conveyer comprising a shaft and a plurality of half flights bolted to the shaft in opposed staggered relation, and a quarter flight bolted to the end flight of the half flights, each flight comprising hub and screw portions, and the end half flight and the quarter flight having notches in the ends of the hubs thereof, and a co-acting collar on the shaft having dogs thereon for engaging the notches of the hubs of the two end flights to assist in holding the two end flights together and to afford a means for rotating the flights and the shaft, and means for fastening the collar against rotation on the shaft.

7. In a conveyer, a plurality of flights each comprised of a hub and a portion of a helical thread, and means for securing the flights together in overlapping, staggered, face-to-face relation comprising bolts passing through the overlapping portions of successive flights, the hubs being provided with elongated, longitudinally-extending openings where the bolts pass therethrough in order that adjacent flights may be overlapped to a greater or less degree to cause the threads of adjacent flights to lap each other to a greater or less extent as desired, to cause an agitating action on the material being carried by the conveyer and to permit lengthening and shortening adjustment of the conveyer screw formed by the successive flights.

NILS M. ROSENDAHL.